June 21, 1949.  J. L. PERKINS  2,473,816
DRIVE MECHANISM
Filed Jan. 4, 1946
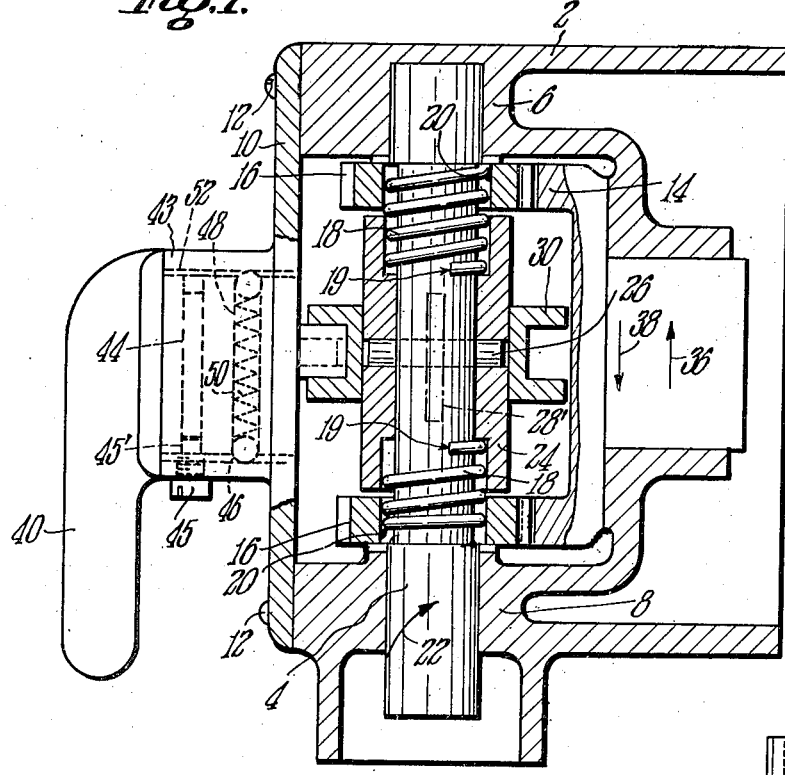
INVENTOR.
Julian L. Perkins.

UNITED STATES PATENT OFFICE 2,473,816

DRIVE MECHANISM

Julian L. Perkins, West Springfield, Mass., assignor to Perkins Machine and Gear Company, West Springfield, Mass., a corporation of Massachusetts Application January 4, 1946, Serial No. 639,021

1 Claim. (Cl. 74—376)

This invention relates to drive mechanism and is directed more particularly to wringer heads for washing machines.

The principal objects of the invention are directed to the provision of a wringer head such as used with a washing machine for driving the rolls of a wringer in opposite directions.

A washing machine usually has a column which extends upwardly of the tub in which is a drive shaft. A wringer head or drive is mounted on the column and the wringer is attached thereto. The head has reversible driving mechanism therein for driving the wringer rolls in opposite directions.

According to this invention, a drive mechanism is provided which is simple in construction so as to be economical to produce, and is efficient in operation and consists of a novel combination and arrangement of parts.

With the foregoing and various other novel features and advantages and other objects of my invention as will become more apparent as the description proceeds, the invention consists in certain novel features of construction and in the combination and arrangement of parts as will be hereinafter more particularly pointed out in the claim hereunto annexed and more fully described and referred to in connection with the accompanying drawings wherein:

Fig. 1 is a sectional elevational view through a wringer head drive mechanism embodying the novel features of the invention;

Fig. 2 is an elevational view of the shiftable parts of the drive mechanism shown in Fig. 1;

Fig. 3 is a perspective view of the clutch actuating part of the mechanism;

Fig. 4 is an end view of the shifter mechanism; and

Fig. 5 is a plan view of one of the driving pinions of the drive mechanism.

Referring now to the drawings more in detail, the invention will be fully described.

A housing is represented by 2 which supports the drive mechanism of the invention. A drive shaft 4 is journalled in upper and lower bearings 6 and 8 of the support. A cover 10 may be provided which is secured to the housing as by screws 12 or the like.

A driven gear 14 is rotatable in the support and is adapted to be connected to a roll of a wringer which may be secured to the support whereby said roll may be driven.

Driving gears or pinions 16 are in mesh with the driven gear 14. Clutch members 18 surround the shaft 4 and extend into bores provided in the pinions 16 with their outer ends secured to the said pinions in any desired manner as by welding at 20.

The pinions 16 and clutch members 18 are normally rotatable on the shaft 4 which, for purposes of description, will be assumed to rotate in the direction of arrow 22.

A sleeve 24 is fixed to the shaft 4 in any well known manner, as by a pin 26, so as to be rotated by said shaft. Said sleeve has upper and lower bores in which the inner ends of springs 18 are disposed, as shown.

The sleeve 24 has a longitudinal slot 25 on one side thereof and an actuator 28 is slidable up and down therein. A spool 30 is slidable up and down on the sleeve and prongs 32 on the actuator 28 abut upper and lower sides of said spool.

In the neutral position of the parts the spool and actuator are positioned relative to the sleeve, as shown in Fig. 2, so that the said actuator is positioned relative to the clutch springs 18 as indicated by dot-dash lines 28' in Fig. 1.

The opposite ends of the actuator at 34 are formed to engage the inner ends of the springs 18 and with the shaft 4 in rotation as the actuator is shifted up or down an end thereof engages the inner end 19 of a spring so as to cause the spring to expand within the spool and pinion and thereby clutch the pinion to the rotating sleeve whereby the driven gear is rotated through the pinion.

When the spool and actuator are moved upwardly, the upper spring 18 is expanded so that through upper pinion 16 the gear 14 is rotated in the direction of arrow 36. When the spool and actuator are moved downwardly the lower spring 18 is expanded so that through the lower pinion 16 the driven gear 14 is rotated in the direction of arrow 38. Thus by moving the spool and actuator in opposite directions from the neutral position the driven gear may be driven in opposite directions for driving the rolls of a wringer in the direction desired.

The spool and actuator may be shifted by any suitable means. For illustrative purposes an operating handle 40 has a hub part 42 rotatable in a bearing 43 of the cover 10. A retaining screw 45 in the bearing 43 has an inner portion 45' in a circumferential groove 44 of the hub 42 to hold the handle against endwise displacement.

Detents 46 in a bore 48 of the hub part 42 are urged outwardly by a spring 50. Grooves 52 in the bearing 43 are provided to receive the detents and are disposed to releasably hold the lever in neutral and either one of its operating positions.

A pin 54 on the inner end of hub part 42 is eccentrically disposed relative to the axis of rotation of said part and has a block 56 thereon which fits between flanges 58 of spool 30.

By swinging the handle 40 in one direction or the other from its neutral position, the collar 30 is shifted so as to bring the actuator into engagement with the inner end of one clutch spring or the other for clutching the desired pinion to the sleeve 24 thereby to rotate the driven gear 14 in the direction desired.

The invention may be embodied in other specific forms without departing from the essential characteristics thereof. Hence, the present embodiments are therefore to be considered in all respects merely as being illustrative and not as being restrictive, the scope of the invention being indicated by the appended claim rather than by the foregoing description, and all modifications and variations as fall within the meaning and purview and range of equivalency of the appended claim are therefore intended to be embraced therein.

What it is desired to claim and secure by Letters Patent of the United States is:

Driving mechanism for a wringer comprising in combination, a support, a drive shaft and a driven gear journalled therein, pinions rotatable on said drive shaft in mesh with said gear, loosely wound coil clutch springs around said drive shaft each having an outer end secured to one of said pinions and provided with free inner ends, a sleeve fixed on said shaft having bores in opposite ends in which inner end portions of the springs are disposed and provided with a longitudinal slot in a side thereof, an actuator slidable up and down in said slot having opposite ends to engage the inner ends of said springs, a collar slidable up and down on said sleeve in engagement with said actuator for operating the same, an operating member rotatable in said support having a part engaging said collar whereby as said member is rotated between neutral and operating positions said collar is moved thereby to move said actuator into and out of engagement with inner ends of said springs, and a spring pressed detent in said support receivable in recesses provided in said member whereby said member is releasably held in neutral or operating position.

JULIAN L. PERKINS.

REFERENCES CITED

The following references are of record in the file of this patent:

UNITED STATES PATENTS

| Number | Name | Date |
|---|---|---|
| Re. 22,767 | Starkey | June 11, 1946 |
| 1,853,919 | More | Apr. 12, 1932 |